(12) United States Patent
Davis et al.

(10) Patent No.: US 7,545,813 B2
(45) Date of Patent: Jun. 9, 2009

(54) METHOD AND APPARATUS FOR REGISTERING MULTIPLE REMOTE NODES IN AN ETHERNET PASSIVE OPTICAL NETWORK

(75) Inventors: Lawrence D. Davis, Petaluma, CA (US); Glen Kramer, Petaluma, CA (US)

(73) Assignee: Teknovus, Inc., Petaluma, CA (US)

( * ) Notice: Subject to any disclaimer, the term of this patent is extended or adjusted under 35 U.S.C. 154(b) by 1002 days.

(21) Appl. No.: 10/850,738

(22) Filed: May 21, 2004

(65) Prior Publication Data

US 2005/0047782 A1  Mar. 3, 2005

Related U.S. Application Data

(60) Provisional application No. 60/497,679, filed on Aug. 26, 2003.

(51) Int. Cl.
*H04L 12/28* (2006.01)
(52) U.S. Cl. .............. 370/395.4; 370/458; 370/461; 396/168
(58) Field of Classification Search .......... 370/235, 370/466, 389, 395.53, 448, 468, 535, 392; 709/223
See application file for complete search history.

(56) References Cited

U.S. PATENT DOCUMENTS

| | | | | |
|---|---|---|---|---|
| 6,026,092 | A * | 2/2000 | Abu-Amara et al. | 370/411 |
| 6,031,821 | A * | 2/2000 | Kalkunte et al. | 370/235 |
| 6,778,557 | B1 * | 8/2004 | Yuki et al. | 370/468 |
| 7,301,970 | B2 * | 11/2007 | Kim et al. | 370/535 |
| 2003/0177216 | A1 * | 9/2003 | Sutherland et al. | 709/223 |
| 2003/0179751 | A1 * | 9/2003 | Omae et al. | 370/392 |
| 2003/0235205 | A1 * | 12/2003 | Song et al. | 370/466 |
| 2004/0114592 | A1 * | 6/2004 | Kang et al. | 370/389 |

(Continued)

OTHER PUBLICATIONS

Kramer et al., "Supporting differentiated classes of service in Ethernet passive optical networks", Aug. & Sep. 2002, Optical Society of America, Journal of Optical Networking, vol. 1 Nos. 8 & 9.*

(Continued)

*Primary Examiner*—Hassan Kizou
*Assistant Examiner*—Jeffrey M Rutkowski
(74) *Attorney, Agent, or Firm*—Park, Vaughan & Fleming LLP; Shun Yao

(57) ABSTRACT

One embodiment of the present invention provides a system that facilitates registration of remote nodes in an Ethernet passive optical network (EPON). The system includes a central node and at least one remote node, wherein a number of virtual remote nodes are coupled to a common physical remote node and transmit upstream data through a common transmitter within the common physical remote node. During an initial discovery cycle, the system receives a solicitation message from the central node at a remote node, wherein the solicitation message assigns a discovery slot in which an unregistered remote node may transmit a response message to the central node for registration. The system then transmits a response message from an unregistered remote node to register within the assigned discovery slot. If multiple virtual remote nodes coupled to the common physical remote node seek registration concurrently, the system controls the transmission of response messages from these virtual remote nodes to the central node so as to avoid collisions between response messages from different remote nodes.

60 Claims, 10 Drawing Sheets

U.S. PATENT DOCUMENTS

| | | | |
|---|---|---|---|
| 2004/0120326 A1* | 6/2004 | Yoon et al. | 370/395.53 |
| 2004/0146064 A1* | 7/2004 | Kramer | 370/448 |
| 2004/0252714 A1* | 12/2004 | Oh et al. | 370/437 |
| 2005/0027874 A1* | 2/2005 | Kim et al. | 709/230 |
| 2005/0041682 A1* | 2/2005 | Kramer | 370/458 |

OTHER PUBLICATIONS

An, F.; Bae, H.; Hsueh, Y.; Rogge, M.; Kazovsky, L.; Kim, K., "A new media access control protocol guaranteeing fairness among users in Ethernet-based passive optical networks," Optical Fiber Communications Conference, 2003. OFC 2003, vol., No., pp. 134-135 vol. 1, Mar. 23-28, 2003.*

Kramer, Glen: "Contention Resolution (random delay, exponential back-off, or both?)"'Online! Nov. 15, 2002, XP002312289 Retrieved from the Internet: URL:http//www.ieee802.org/3/efm/public/nov02/p2mp/kramer_p2mp_1-1102.pdf>'retrieved on Jan. 3, 2005 the whole document.

Pesavento G: "Ethernet Passive Optical Network (EPON) Architecture for Broadband Access" Optical Networks Magazine, SPIE, Bellingham, WA US, vol. 4, No. 1, Jan. 2003, pp. 107-113, XP001162954 ISSN: 1388-6916 section 10.

Tony Anderson et al., MPCP Auto Discovery Baseline Proposal, Mar. 2002 XP002243928 pp. 3, 4, 7-10.

* cited by examiner

METHOD AND APPARATUS FOR REGISTERING MULTIPLE REMOTE NODES IN AN ETHERNET PASSIVE OPTICAL NETWORK

RELATED APPLICATION

This application hereby claims priority under 35 U.S.C. §119 to U.S. Provisional Patent Application No. 60/497,679 filed on 26 Aug. 2003, entitled, "Method and Procedure for Registering Multiple Virtual Optical Network Terminals Located in One Physical Optical Network Terminal," by inventor Lawrence D. Davis.

BACKGROUND

1. Field of the Invention

The present invention relates to the design of passive optical networks. More specifically, the present invention relates to a method and apparatus for discovering multiple remote nodes in an Ethernet passive optical network.

2. Related Art

In order to keep pace with increasing Internet traffic, optical fibers and associated optical transmission equipment have been widely deployed to substantially increase the capacity of backbone networks. However, this increase in the capacity of backbone networks has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among the different technologies presently under development, the Ethernet passive optical network (EPON) is one of the best candidates for next-generation access networks. EPONs combine ubiquitous Ethernet technology with inexpensive passive optics. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Such integrated service is difficult to provide with DSL or CM technology. Furthermore, EPONs are more suitable for Internet Protocol (IP) traffic, since Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers (see FIG. 1).

Transmissions within an EPON are typically between an optical line terminal (OLT) and optical networks units (ONUs) (see FIG. 2). Note that ONUs are sometimes also called optical network terminals (ONTs). The OLT generally resides in the central office and couples the optical access network to a metro backbone, which is typically an external network belonging to an Internet Service Provider (ISP) or a local exchange carrier. An ONU can be located either at the curb or at an end-user location, and can provide broadband voice, data, and video services. ONUs are typically coupled to a one-by-N (1×N) passive optical coupler, where N is the number of ONUs, and the passive optical coupler is typically coupled to the OLT through a single optical link. This configuration can achieve significant savings in the number of fibers and amount of hardware required by EPONs.

Communications within an EPON include downstream traffic (from OLT to ONUs) and upstream traffic (from ONUs to OLT). In the downstream direction, because of the broadcast nature of the 1×N passive optical coupler, downstream data frames broadcast by the OLT can reach all ONUs and are subsequently extracted by their destination ONUs. In the upstream direction, the ONUs need to share channel capacity and resources, because there is only one link coupling the passive optical coupler with the OLT.

Correspondingly, an EPON typically employs some arbitration mechanism to avoid data collision and to provide fair sharing of the upstream fiber-channel capacity. This is achieved by allocating a transmission window (timeslot) to each ONU. Each timeslot is capable of carrying several Ethernet packets. An ONU typically buffers packets it receives from a subscriber until its timeslot arrives. When its timeslot arrives, the ONU "bursts" all stored frames to the OLT at full channel speed.

To allow ONUs to join an EPON at arbitrary times, an EPON generally has two modes of operation: a discovery (initialization) mode and a normal operation mode. The normal operation mode accommodates regular upstream data transmissions, in which transmission opportunities are assigned in turn to all initialized ONUs. Note that an OLT regularly enters discovery mode to allow new ONUs to join the EPON. The discovery mode provides a time window used to detect newly joined ONUs while regular upstream data transmission is suspended. When the OLT successfully registers a newly joint ONU, it assigns the ONU a logical link ID (LLID), which corresponds to the ONUs medium access control (MAC) address. This LLID identifies the particular ONU during future communications with the OLT The current EPON architecture allows an ONU to have multiple LLIDs. When an OLT assigns multiple LLIDs to an ONU, each LLID represents an equivalent of a logical ONU to the OLT, although all the LLIDs are associated to a common physical ONU. This feature allows a number of user devices to couple with the common physical ONU and operate as virtual ONUs (VONUs). During discovery, these VONUs may behave just like a regular ONU, although they transmit all their data through the common physical ONU.

Because more than one unregistered VONU can request registration with the OLT and the upstream response messages are not scheduled (because the newly joined VONUs are not initialized yet), the discovery process is subject to collision between response messages. If the collision probability is high, an EPON will need to stay in discovery mode for a longer time and may need to enter discovery mode more frequently, resulting in reduced usable bandwidth for regular data transmission.

Hence, what is needed is a method and apparatus for discovering remote nodes in an EPON, which reduces collision during the discovery process and provides more efficient upstream bandwidth utilization.

SUMMARY

One embodiment of the present invention provides a system that facilitates registration of remote nodes in an Ethernet passive optical network (EPON). The system includes a central node and at least one remote node, wherein a number of virtual remote nodes are coupled to a common physical remote node and transmit upstream data through a common transmitter within the common physical remote node. During an initial discovery cycle, the system receives a solicitation message from the central node at a remote node, wherein the solicitation message assigns a discovery slot in which an unregistered remote node may transmit a response message to the central node for registration. The system then transmits a response message from an unregistered remote node to register within the assigned discovery slot. If multiple virtual remote nodes coupled to the common physical remote node seek registration concurrently, the system controls the transmission of response messages from these virtual remote nodes to the central node so as to avoid collisions between response messages from different remote nodes.

In a variation of this embodiment, the common physical remote node maintains a queue to store the response messages from the virtual remote nodes. If multiple virtual remote nodes coupled to the common physical remote node seek registration concurrently, the common physical remote node transmits only one response message from the queue to the central node during the assigned discovery slot.

In a further variation, if multiple virtual remote nodes coupled to the common physical remote node seek registration concurrently, the common physical remote node transmits the response message at the head of the queue. If the response message does not result in a successful registration, the common physical remote node re-inserts the same response message at the tail of the queue.

In a further variation, if multiple virtual remote nodes coupled to the common physical remote node seek registration concurrently, the common physical remote node allows the response message at the head of the queue to attempt a number of transmissions to obtain a successful registration. If after the number of transmissions the response message still does not result in a successful registration, the common physical remote node re-inserts the response message at the tail of the queue In a further variation, if multiple virtual remote nodes coupled to the common physical remote node seek registration concurrently, and if after the number of transmissions the response message does not result in a successful registration, the common physical remote node suspends transmission of the response message for a predefined interval of time or for a predefined number of discovery cycles. After this suspension, the common physical remote node re-inserts the response message at the tail of the queue.

In a variation of this embodiment, if multiple virtual remote nodes coupled to the common physical remote node seek registration concurrently, the common physical remote node transmits a number of response messages within the assigned discovery slot wherein each response message is associated with a virtual remote node seeking registration and wherein the response messages do not overlap with one another within the discovery slot In a further variation, the common physical remote node transmits the number of response messages back-to-back within the assigned discovery slot.

In a variation of this embodiment, if multiple virtual remote nodes coupled to the common physical remote node seek registration concurrently, the common physical remote node sends one aggregate response message which carries registration information for all the unregistered virtual remote nodes coupled to the common physical node. This aggregate response message allows registration of multiple virtual remote nodes simultaneously.

In a variation of this embodiment, if a predefined number of prior transmissions of the response message did not result in a successful registration, the system suspends the transmission of a response message from an unregistered remote node or an unregistered virtual remote node for a suspension period.

In a further variation, the suspension period is a predefined interval of time or a predefined number of discovery cycles.

In a further variation, the system resumes the transmission of the response message upon receiving a unicast solicitation message from the central node.

In a variation of this embodiment, if a response message from an unregistered remote node or an unregistered virtual remote node results in an explicit negative acknowledgement from the central node, the system suspends future transmission of the response message for a predefined period.

In a variation of this embodiment, if a response message from an unregistered remote node or an unregistered virtual remote node results in an explicit negative acknowledgement from the central node, the system suspends future transmission of the response message until a unicast solicitation is received from the central node.

In a further variation, the suspension is subject to a timeout period, at the end of which transmission of the response message is resumed.

In a further variation, if a response message from an unregistered remote node or an unregistered virtual remote node results in an explicit negative acknowledgement from the central node, the system continuously monitors the downstream data transmitted by the central node. If there is a disruption in the downstream data sent by the central node, which may indicate a power loss or a system restart at the central node, the system exits the suspension and resumes transmission of the response message.

Another embodiment of the present invention provides a system that facilitates registration of remote nodes in an Ethernet passive optical network (EPON). The system includes a central node and at least one remote node, wherein a number of virtual remote nodes are coupled to a common physical remote node and transmit upstream data through a common transmitter within the common physical remote node. During an initial discovery cycle, the system receives a solicitation message from the central node at a remote node, wherein the solicitation message assigns a discovery slot in which an unregistered remote node may transmit a response message to the central node for registration. The system then selectively transmits a response message from an unregistered remote node or an unregistered virtual remote node for registration within the assigned discovery slot, thereby reducing the collision probability among transmitted response messages.

In a variation of this embodiment, if a predefined number of prior transmissions of the response message did not result in a successful registration, the system suspends the transmission of the response message for a suspension period.

In a further variation, the suspension period is a predefined interval of time or a predefined number of discovery cycles.

In a further variation, if a predefined number of prior transmissions of the response message did not result in a successful registration, the system resumes the transmission of the response message upon receiving a unicast solicitation message from the central node.

In a variation of this embodiment, if a response message from an unregistered remote node or an unregistered virtual remote node results in an explicit negative acknowledgement from the central node, the system suspends future transmission of the response message for a predefined period.

In a variation of this embodiment, if a response message from an unregistered remote node or an unregistered virtual remote node results in an explicit negative acknowledgement from the central node, the system suspends future transmission of the response message until a unicast solicitation is received from the central node.

In a further variation, the suspension is subject to a timeout period, at the end of which transmission of the response message is resumed.

In a further variation, if a response message from an unregistered remote node or an unregistered virtual remote node results in an explicit negative acknowledgement from the central node, the system continuously monitors the downstream data transmitted by the central node. If there is a disruption in the downstream data sent by the central node, which may indicate a power loss or a system restart at the central node, the system exits the suspension and resumes transmission of the response message.

In a variation of this embodiment, the system maintains a queue within the common physical node to store the response messages from the virtual remote nodes. If multiple virtual remote nodes coupled to the common physical remote node seek registration concurrently, the system transmits only one response message from the queue to the central node during the assigned discovery slot.

In a further variation, the system transmits the response message at the head of the queue. If the response message does not result in a successful registration, the system re-inserts the response message at the tail of the queue.

In a further variation, if multiple virtual remote nodes coupled to the common physical remote node seek registration concurrently, the system allows the response message at the head of the queue to attempt a number of transmissions to obtain a successful registration. If after the number of transmissions the response message still does not result in a successful registration, the system re-inserts the response message at the tail of the queue.

In a further variation, if multiple virtual remote nodes coupled to the common physical remote node seek registration concurrently, and if after the number of transmissions the response message does not result in a successful registration, the system suspends transmission of the response message for a predefined interval of time or for a predefined number of discovery cycles. After the suspension, the system re-inserts the response message at the tail of the queue.

In a variation of this embodiment, if multiple virtual remote nodes coupled to the common physical remote node seek registration concurrently, the system transmits a number of response messages within the assigned discovery slot wherein each response message is associated with a virtual remote node seeking registration and wherein the number of response messages do not overlap with one another within the discovery slot.

In a further variation, the system transmits the number of response messages back-to-back within the assigned discovery slot.

In a variation of this embodiment, if multiple virtual remote nodes coupled to the common physical remote node seek registration concurrently, the system sends one aggregate response message which carries registration information for all the unregistered virtual remote nodes coupled to the common physical node. The aggregate response message allows registration of multiple virtual remote nodes simultaneously.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The data structures and procedures described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated).

Passive Optical Network Topology

Figure 1:
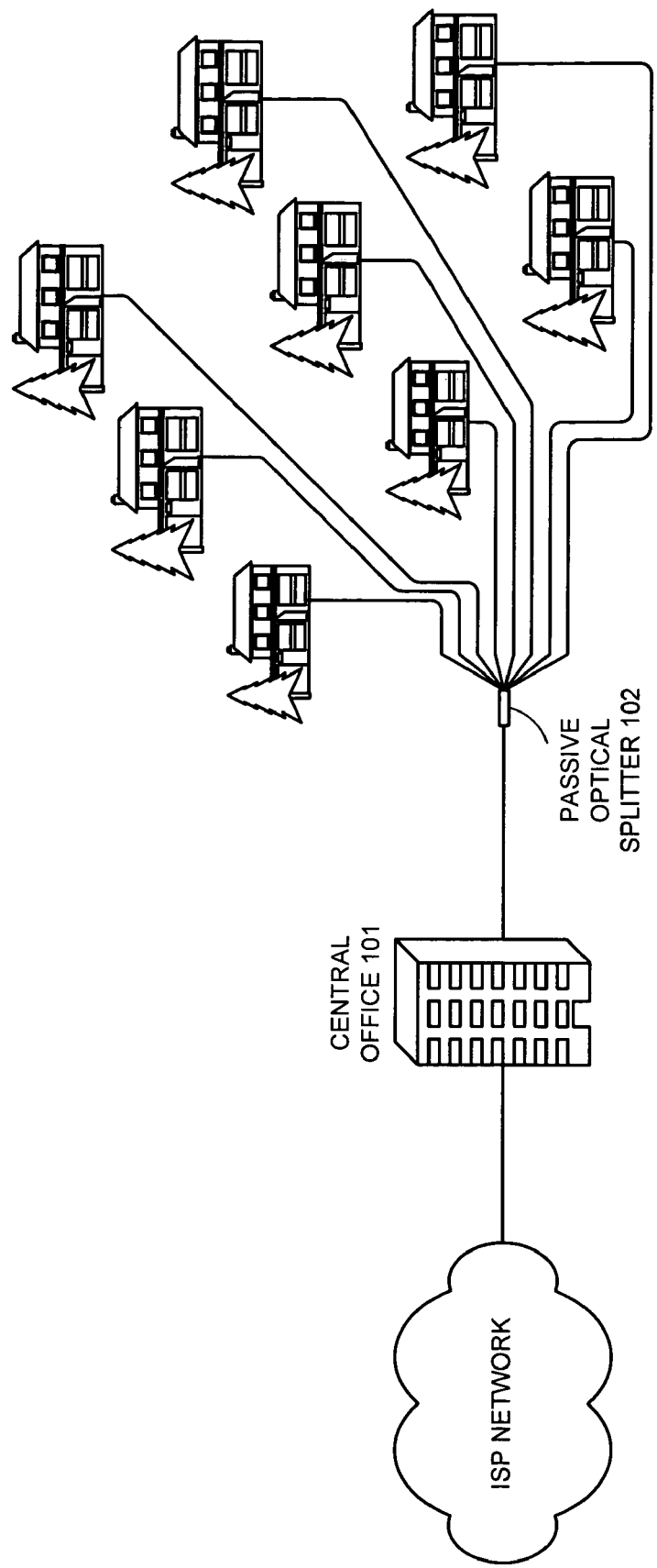
FIG. 1 illustrates a passive optical network wherein a central office and a number of subscribers are coupled through optical fibers and a passive optical splitter.

FIG. 1 illustrates a passive optical network (PON), wherein a central office and a number of subscribers are coupled together through optical fibers and a passive optical splitter.

As shown in FIG. 1, a number of subscribers are coupled to a central office 101 through optical fibers and a passive optical splitter 102. Passive optical splitter 102 can be placed in the vicinity of end-user locations, so that the initial fiber deployment cost is minimized. Central office 101 can be coupled to an external network 103, such as a metropolitan area network operated by an Internet service provider (ISP). Note that although FIG. 1 illustrates a tree topology, a PON can also be based on other topologies, such as a ring or a bus.

Normal Operation Mode

Figure 2:
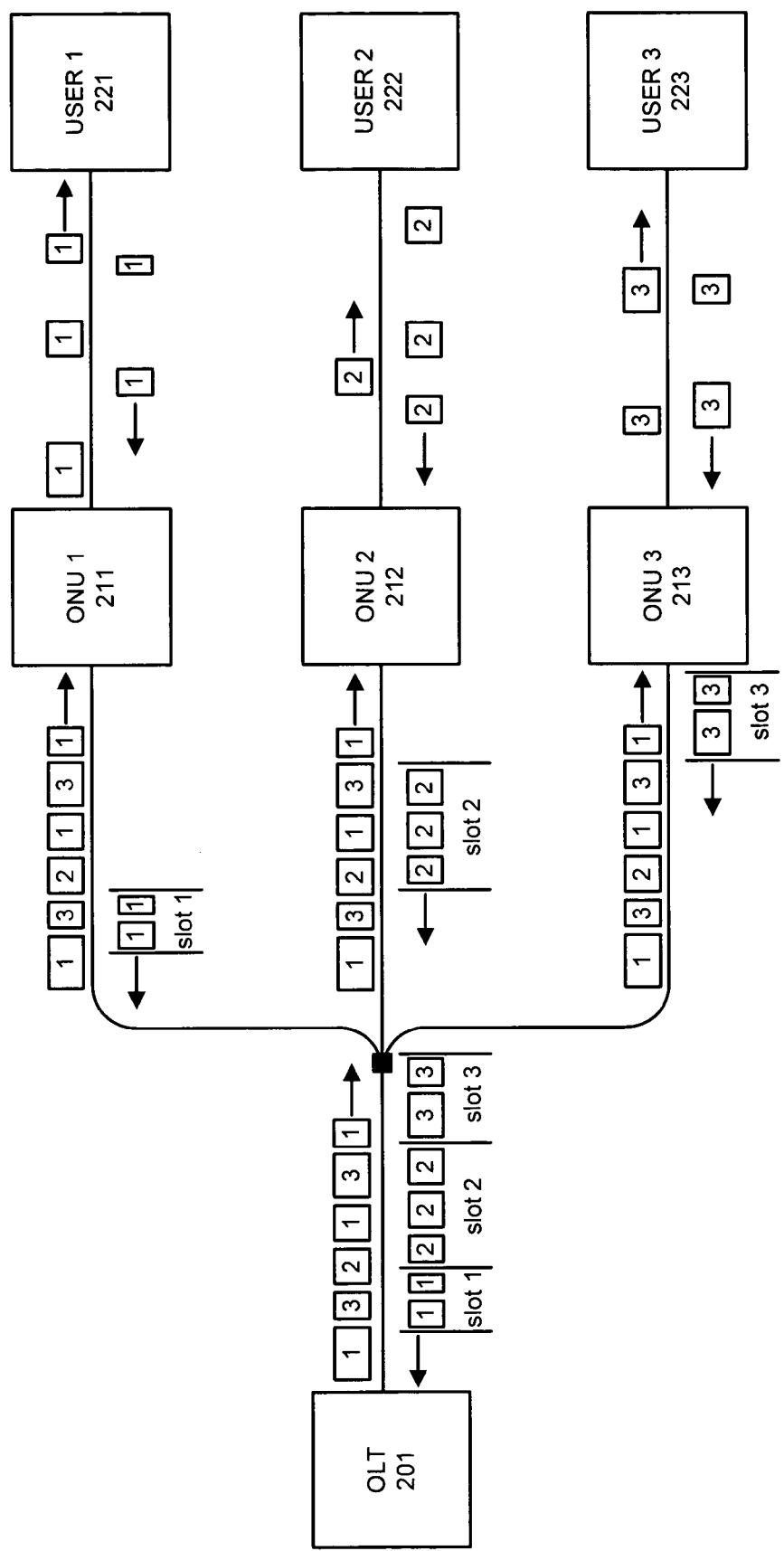
FIG. 2 illustrates an EPON in normal operation mode.

FIG. 2 illustrates an EPON in normal operation mode. To allow ONUs to join an EPON at arbitrary times, an EPON typically has two modes of operation: a normal operation mode and a discovery (initialization) mode. Normal operation mode accommodates regular upstream data transmissions, in which transmission opportunities are assigned to all initialized ONUs.

As shown in FIG. 2, in the downstream direction, OLT 201 broadcasts downstream data to ONU 1 (211), ONU 2 (212), and ONU 3 (213). While all ONUs receive the same copy of downstream data, each ONU selectively forwards only the data destined to itself to its corresponding users, which are user 1 (221), user 2 (222), and user 3 (223), respectively.

In the upstream direction, OLT 201 first schedules and assigns transmission windows to each ONU according to the ONU's service-level agreement. When not in its transmission timeslot, an ONU typically buffers the data received from its user. When its scheduled transmission timeslot arrives, an ONU transmits all the buffered user data within the assigned transmission window.

Figure 3:
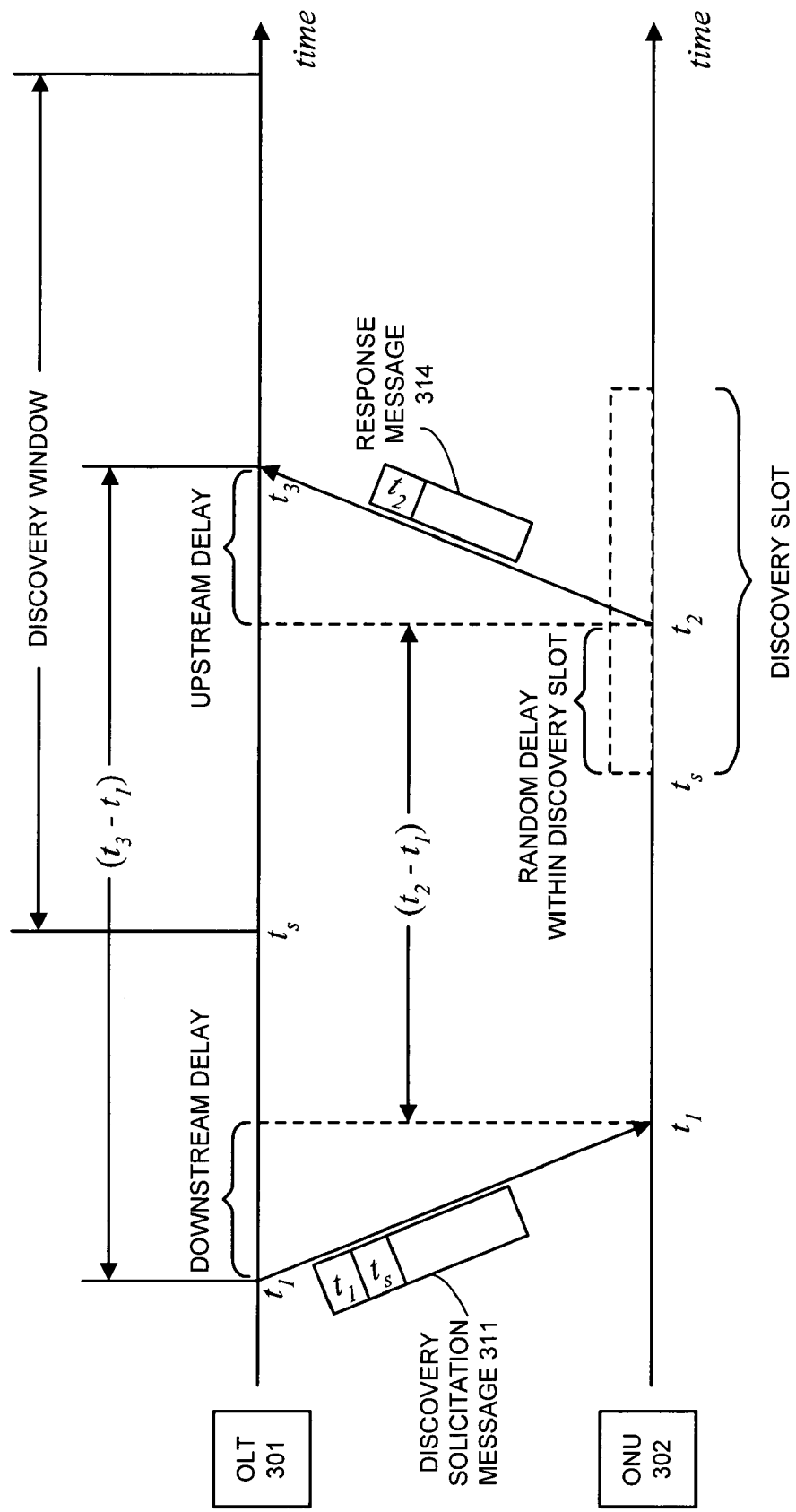
FIG. 3 presents a time-space diagram illustrating the discovery process.

Since every ONU takes turns in transmitting upstream data according to the OLT's scheduling, the upstream link's capacity can be efficiently utilized. However, for the scheduling to work properly, the OLT needs to discover and initialize a newly joined ONU. During discovery, the OLT may collect information critical to transmission scheduling, such as the ONU's round-trip propagation delay, its media access (MAC) address, its service-level agreement, etc. (Note that in some cases service-level agreement may already be known to the OLT), Discovery Mode in EPON FIG. 3 presents a time-space diagram illustrating the discovery process. At the beginning of the discovery process, OLT 301 first sets a start time $t_s$ of a time interval in which OLT 301 enters the discovery mode and allows new ONUs to register (this time interval is called the discovery window). Note that, from the current time until $t_s$, OLT 301 can keep receiving normal upstream data from registered ONUs. OLT 301 also sets a time interval during which each newly joined ONU is allowed to transmit a response message to OLT 301 to request registration (called the discovery slot), wherein the start time of a discovery slot is the same as the start time of the discovery window, $t_s$. Since there might be more than one ONU seeking registration, and since the distance between an unregistered ONU and OLT 301 is unknown, the size of the discovery window should at least include the size of a discovery slot and the maximum allowed round-trip delay between an ONU and OLT 301.

At a time $t_1$ ($t_1 < t_s$), OLT 301 broadcasts a discovery solicitation message 311 (which can be a DISCOVERY_GATE message, in accordance to the IEEE 802.3ah multi-point control protocol (MPCP) standard) to all the ONUs, including a newly joined unregistered ONU 302. Discovery solicitation message 311 includes a time stamp of $t_1$, which is the time when the message is sent by OLT 301, and a time stamp of $t_s$, which is the start time of the discovery slot. Upon receiving discovery solicitation message 311, ONU 302 sets its local clock to $t_1$ according to the time stamp carried by discovery solicitation message 311.

When ONU 302's local clock reaches $t_s$, the start time of the discovery slot, ONU 302 waits an additional random delay and then transmits a response message 314 (which can be a REGISTER_REQUEST message, in accordance to the IEEE 802.3ah MPCP standard). This random delay is applied to avoid persistent collisions when response messages from multiple uninitialized ONUs consistently collide. Response message 314 contains ONU 302's MAC address and a timestamp of $t_2$, which is ONU 302's local time when response message 314 is sent.

When OLT 301 receives response message 314 from ONU 302 at time $t_3$, it learns ONU 302's MAC address and ONU 302's local time $t_2$ when response message 314 is sent. OLT 301 can then compute the round-trip delay of ONU 302, which is $[(t_3-t_1)-(t_2-t_1)]=(t_3-t_2)$.

Figure 4:
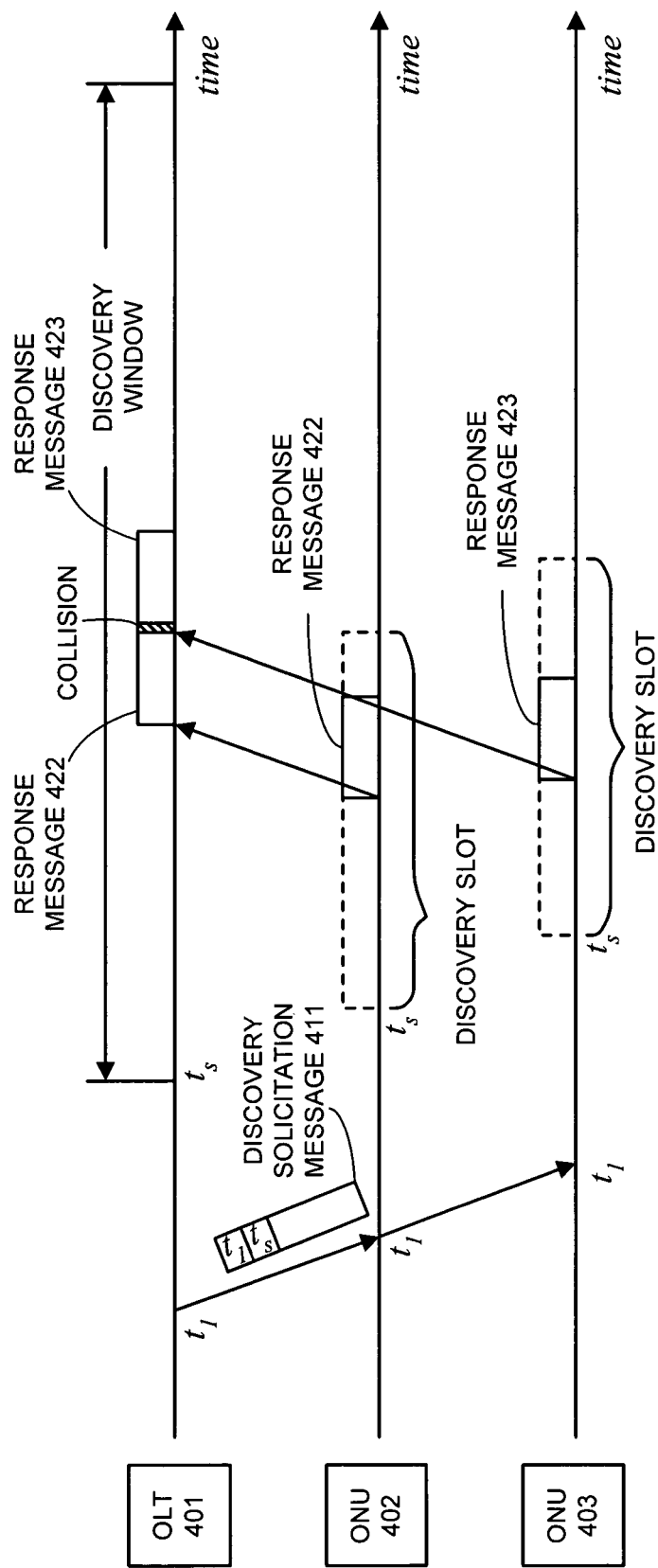
FIG. 4 presents a time-space diagram illustrating collision of response messages during a discovery process.

FIG. 4 presents a time-space diagram illustrating a collision between response messages during a discovery process. At $t_1$, OLT 401 sends out discovery solicitation message 411 with time stamp $t_1$ and discovery slot start time $t_s$. Undiscovered ONUs 402 and 403 set their local clocks to $t_1$ respectively, upon receiving discovery solicitation message 411. Because ONU 403 is located further from OLT 401 than is ONU 402, ONU 403's local clock in fact lags behind ONU 402's local clock. Nevertheless, when both ONU 402's and 403's local clocks reach $t_s$, both ONUs enter the discovery slot. ONU 402 waits for a random delay before it sends out response message 422. Similarly, ONU 403 waits for a random delay before sending out response message 423.

As shown in FIG. 4, when response messages 422 and 423 arrive at OLT 401 within one response-message length from each other, collision occurs. As a result, both response messages 422 and 423 will be garbled and neither request for registration will be successful.

Figure 5:
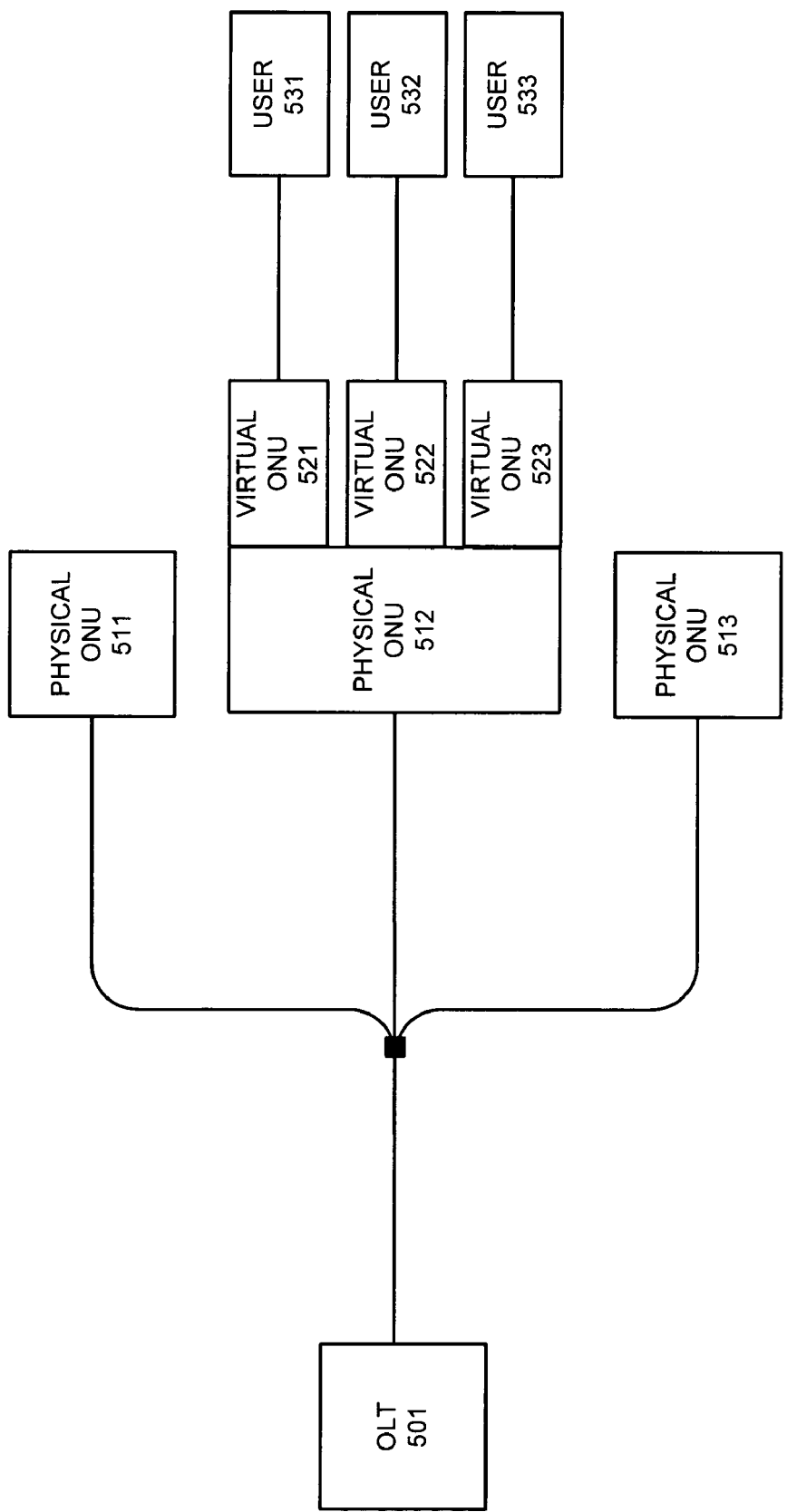
FIG. 5 illustrates multiple VONUs coupled to a common physical ONU.

FIG. 5 illustrates multiple VONUs accommodated in a common physical ONU. The current EPON architecture allows an ONU to have multiple LLIDs. When an OLT assigns an ONU multiple LLIDs, each LLID represents an equivalent of a logical ONU to the OLT, although all the LLIDs are associated to a common physical ONU. In fact, the OLT may treat each LLID as representing an independent, separate ONU. This feature allows a number of user devices to couple to different VONUs accommodated in a common physical ONU and enjoy the status of an independent ONU. During discovery, these VONUs may behave just like a regular physical ONU, whereas the common physical ONU is "transparent" to any data sent by the VONUs. As shown in FIG. 5, OLT 501 may issue one LLID each to physical ONUs 511 and 513, which operate as a single ONU. OLT 501 may assign three LLIDs to common physical ONU 512, which accommodates three VONUs 521, 522, and 523. These VONUs in turn are coupled to users 531, 532, and 533.

Obviously, where a large number of VONUs join an EPON, the probability of collision among the response messages could increase significantly. Hence, one goal of this invention is to reduce the probability of collision among response messages from multiple ONUs while maintaining an efficient utilization of upstream bandwidth.

Deferred Registration

One approach to reduce collision among response messages of VONUs coupled to a common physical ONU is to control the transmission of these response messages at the common physical ONU. In one embodiment of the present invention, if multiple VONUs seek registration concurrently, the OLT will transmit only one response message during one discovery slot, and defer the transmission of other response messages until the OLT assigns subsequent discovery slots. This approach reduces the number of competing VONUs to at most the number of physical ONUs accommodated in the EPON.

A common physical ONU may adopt any scheme, such as a Round-Robin scheme implemented with a first-in-first-out (FIFO) queue, for deferred transmission. In addition, the common physical ONU may grant each response message a number of attempts for registration in consecutive discovery slots. Only if the VONU fails to register after these attempts will its response message be moved to the end of the FIFO queue. Furthermore, the response message may be suspended for a predefined interval of time or a predefined number of discovery cycles before being inserted back to the FIFO queue.

Figure 6:
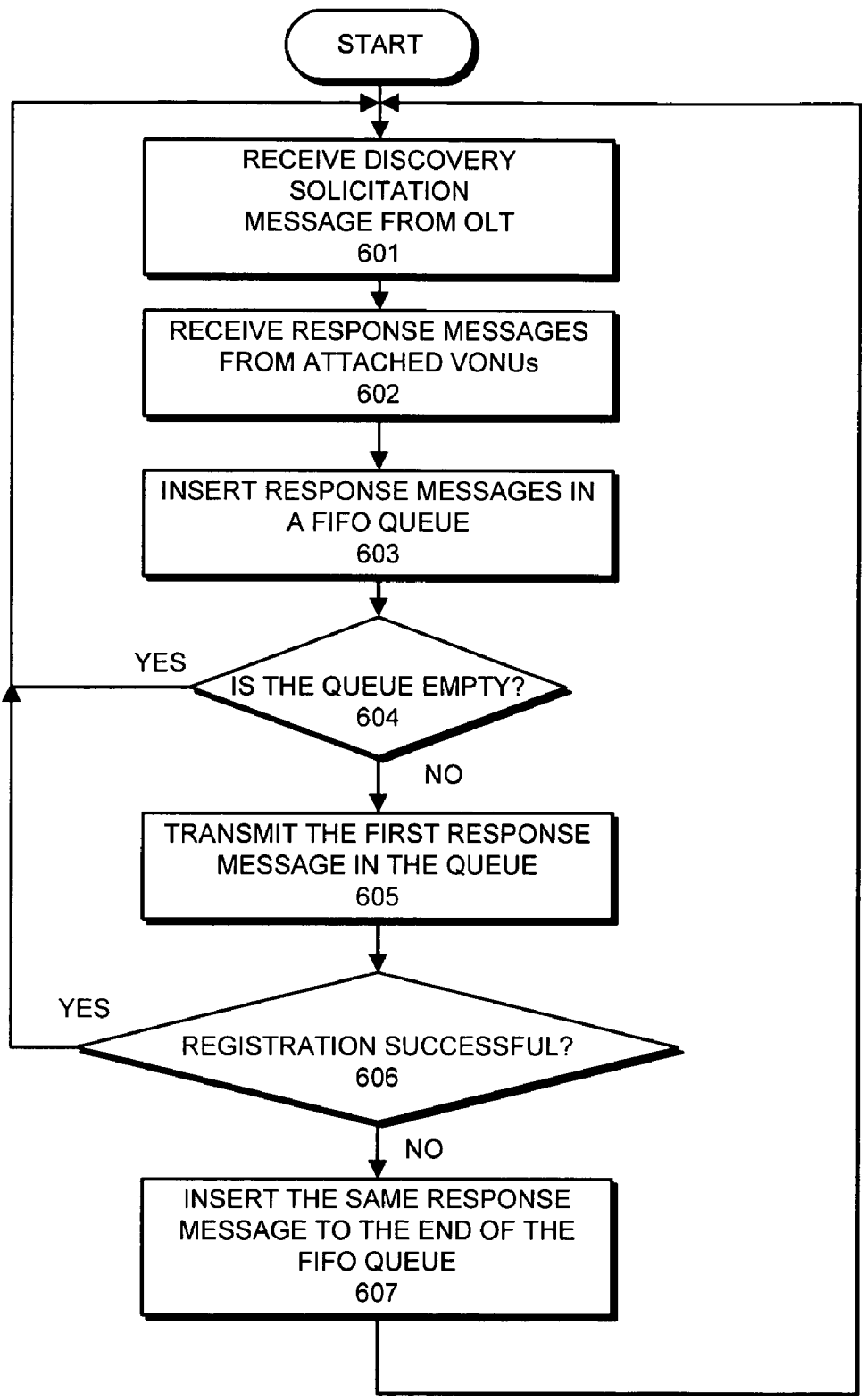
FIG. 6 presents a flow chart illustrating Round-Robin transmission of response messages from multiple VONUs in accordance with an embodiment of the present invention.

FIG. 6 presents a flow chart illustrating Round-Robin transmission of response messages from multiple VONUs in accordance with an embodiment of the present invention. The system in a common physical ONU starts by receiving a discovery gate message from the OLT (step 601). The system then receives response messages from attached VONUs sent in response to the solicitation (step 602). The system subsequently inserts the received response messages in a first-in-first-out (FIFO) queue (step 603). Next, the system determines whether the FIFO queue is empty (step 604). If the queue is empty, which means there are no response messages to transmit, the system resturns to the start and waits for the next solicitation message. If not, the system transmits the first response message in the queue (step 605). The system then determines whether the registration is successful (step 606). If the registration is successful, the system returns to the start and waits for the next solicitation message. If not, the system inserts the same response message to the end of the FIFO queue so it can be transmitted again in the future (step 607).

Multiple Registration

Another approach to reduce collision among the response messages is to re-arrange the VONU response messages such that they can be accommodated within the same discovery slot without overlapping one another. Accordingly, the common physical ONU does not insert a random delay between the start point of the discovery slot and a response message. Instead, it places multiple response messages within the slot with a non-overlapping arrangement. In one embodiment, the response messages are placed back-to-back with one another, such that the collision probability among response messages sent from different physical ONUs is reduced.

Figure 7:
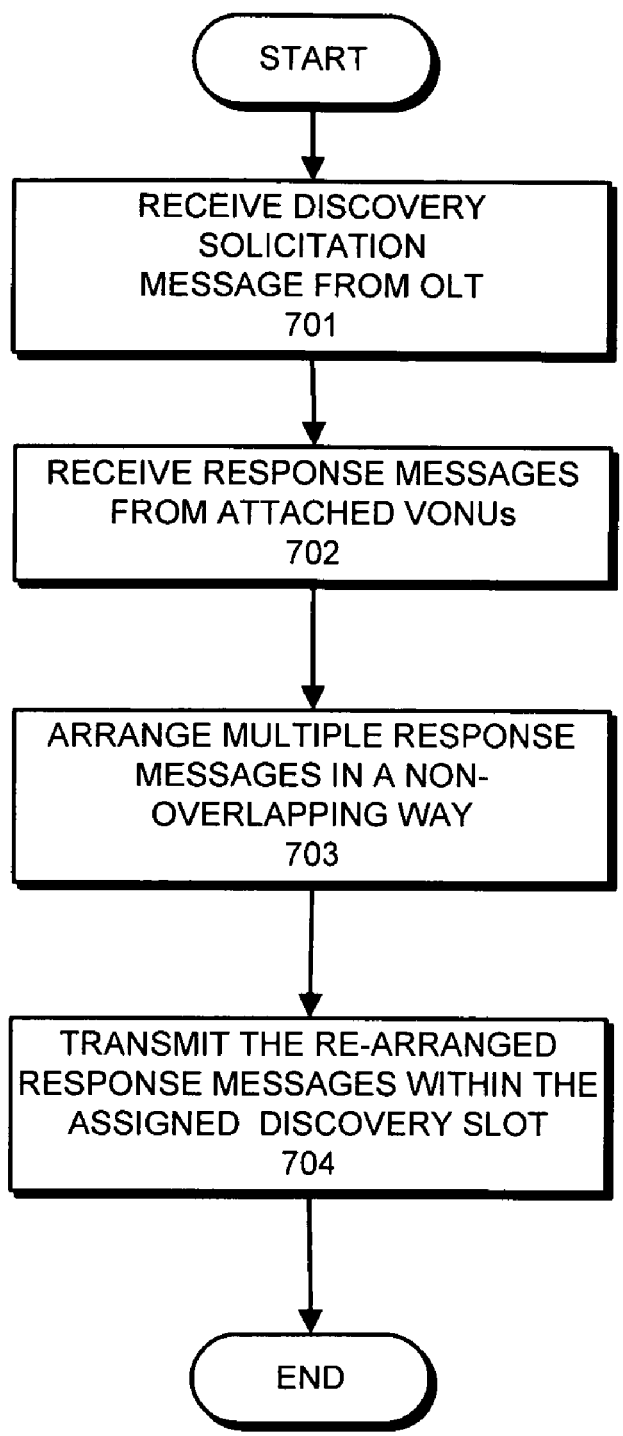
FIG. 7 presents a flow chart illustrating transmission of response messages from multiple VONUs in a non-overlapping arrangement within an assigned discovery-slot in accordance with an embodiment of the present invention.

FIG. 7 presents a flow chart illustrating transmission of response messages from multiple VONUs in a non-overlapping arrangement within an assigned discovery-slot in accordance with an embodiment of the present invention. The system in a common physical ONU starts by receiving a discovery gate message from the OLT (step 701). The system then receives response messages from the responding VONUs sent in response to the solicitation (step 702). Next, the system arranges multiple response messages in a non-overlapping way, so that they can be transmitted in the upcoming discovery slot (step 703). The system subsequently transmits the re-arranged response messages within the assigned discovery slot (step 704).

Bulk Registration

In the current EPON standards, an OLT treats each VONU as if it is a separate physical ONU. Thus, a separate and independent registration process is necessary for registration of each VONU. The present invention proposes to modify this approach. In one embodiment, a physical ONU transmits only one response message, which contain registration information (e.g., MAC addresses) from multiple unregistered VONUs. This approach allows the OLT to assign multiple LLIDs to a single physical ONU within one discovery cycle, thereby significantly reducing the collision probability and upstream bandwidth consumption.

Figure 8:
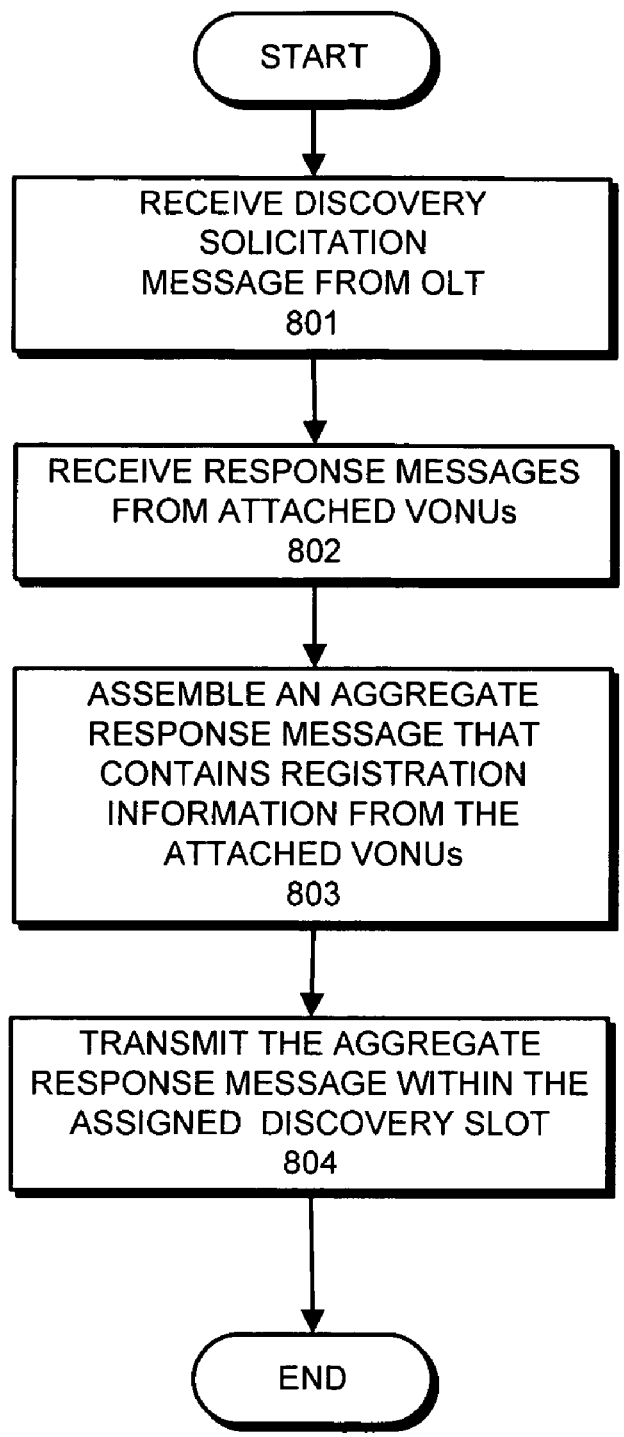
FIG. 8 presents a flow chart illustrating the process of aggregating response messages from multiple VONUs into one aggregate response message in accordance with an embodiment of the present invention.

FIG. 8 presents a flow chart illustrating the process of aggregating response messages from multiple VONUs into one aggregate response message in accordance with an embodiment of the present invention. In a common physical ONU, the system starts by receiving a discovery gate message from the OLT (step 801). The system then receives response messages from responding VONUs sent in response to the solicitation (step 802). Next, the system assembles an aggregate response message that contains registration information from the responding VONUs (step 803). The system subsequently transmits the aggregate response messages within the assigned discovery slot (step 804).

ONU Registration Timeout

In the current EPON standard, an un-registered ONU normally keeps transmitting its own response message in every discovery slot until it successfully registers with the OLT. If the OLT, for any reason, decides to deny registration to an ONU, this ONU still keeps transmitting its response message in every discovery slot, consuming upstream bandwidth in every discovery slot, and possibly increasing collision probabilities for other un-registered ONUs. One approach to mitigate this undesired ONU behavior is to impose a registration timeout after a number of unsuccessful registration attempts. When timeout occurs, an ONU suspends its transmission temporarily and switches to a hibernation mode. Upon expiration of the hibernation, the ONU starts responding to the OLT's solicitation messages again. The duration of the hibernation period may be a predefined interval of time, or a predefined number of discovery cycles. Alternatively, the ONU may exit the hibernation mode when explicitly directed to do so by the OLT. In one embodiment, the OLT may send a unicast discovery gate message to the ONU to pull it out of hibernation.

Figure 9:
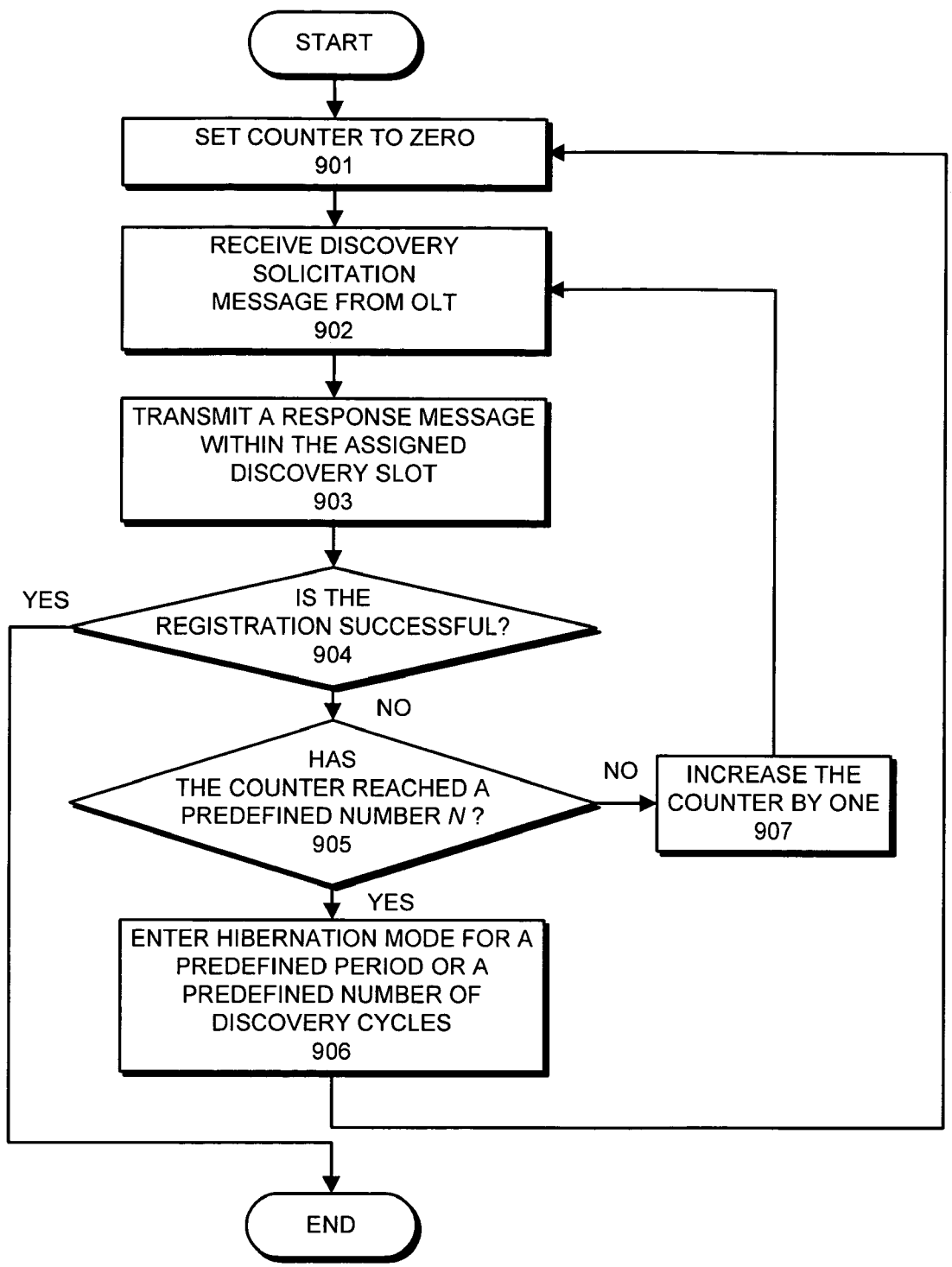
FIG. 9 presents a flow chart illustrating the process of suspending the transmission of a response message after a number of unsuccessful registration attempts in accordance with one embodiment of the present invention.

FIG. 9 presents a flow chart illustrating the process of suspending the transmission of a response message after a number of unsuccessful registration attempts in accordance with one embodiment of the present invention. The system in an ONU starts by setting a counter to zero (step 901). The counter records the number of unsuccessful registrations the ONU has attempted. The system then receives a discovery gate message from the OLT (step 902). In response, the system transmits its response message for registration (step 903). Next, the system determines whether the registration is successful (step 904). If so, the registration process is complete and the system enters normal operation. If not, the system further determines whether the counter has reached a predefined number N. If so, the system enters hibernation for a predefined period of time or a predefined number of discovery cycles (step 906), after which the system will restart at step 901. If not, the system increases the counter by one (step 907) and waits for the next discovery slot to transmit the response message again (step 902).

ONU Suspension

An OLT may deny an ONU's registration for various reasons. In such a situation, the OLT will respond to the ONU's response message with a negative acknowledgement. The default behavior of the ONU is to keep transmitting the response message in the next discovery slot. This is an unnecessary waste of upstream bandwidth. The present invention proposes that, upon receiving a negative acknowledgement, the ONU enter a hibernation mode for a predefined period of time or a predefined number of discovery cycles.

Furthermore, the negative acknowledgement from the OLT may indicate that although the OLT has received the complete registration from the ONU (including the ONU's MAC address), registration is not allowed for the moment. Nevertheless, the OLT has all the address information of the ONU, and can later transmit a unicast discovery gate message to the ONU. Upon receiving a unicast discovery gate message, the ONU exists hibernation and resumes transmission.

It is possible that the OLT may lose power and lose all the address information of the unregistered ONU. As a result, a unicast discovery gate message will be never transmitted to the unregistered ONU, causing the ONU to hibernate indefinitely. One solution to this problem is a hibernation-timeout period, upon the expiration of which the ONU exists hibernation and starts registration again.

In another embodiment, the ONU may continuously monitor the transmission from the OLT. As long as there is a normal and uninterrupted bit stream transmitted by the OLT, the ONU will remain hibernating until it receives a unicast discovery gate message. If there is a disruption in the OLT's bit stream, it could mean that the OLT has lost its power and has lost the ONU's address information as well. In order to deal with this potential problem, after a bit stream disruption is detected, the ONU exits hibernation and starts responding to a broadcast discovery gate message again.

Figure 10:
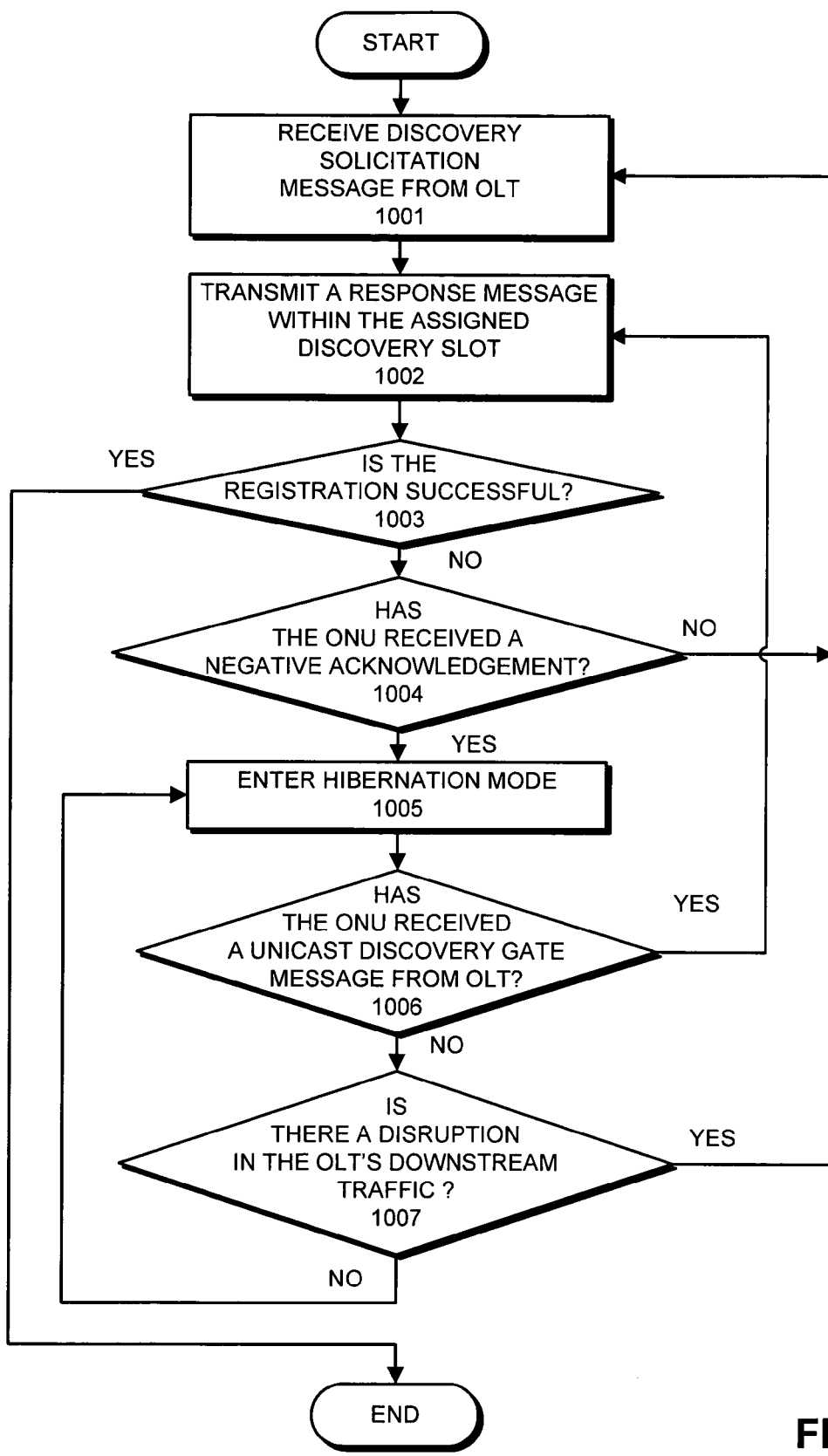
FIG. 10 presents a flow chart illustrating the process of suspending the transmission of a response message upon receiving a negative acknowledgment from the OLT in accordance with one embodiment of the present invention.

FIG. 10 presents a flow chart illustrating the process of suspending the transmission of a response message upon receiving a negative acknowledgment from the OLT in accordance with one embodiment of the present invention. An unregistered ONU starts by receiving a discovery gate message from the OLT (step 1001). The ONU then transmits a response message in the assigned discovery slot (step 1002). If the registration is successful (step 1003), the ONU completes the registration process and enters normal operation mode. If not, the ONU further determines whether it has received a negative acknowledgement from the OLT (step 1004). If so, the ONU enters a hibernation mode (step 1005). While in hibernation, the ONU continues to monitor whether the OLT has transmitted a unicast discovery gate message (step 1006). If the ONU receives such a message, it exits the hibernation mode and retransmits its response message (step 1002). If not, the ONU also monitors whether there has been a disruption in the OLT's downstream traffic indicating a power loss or a restart (step 1003). If there is a disruption, the ONU exits hibernation and restarts its normal registration process (step 1001).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for registering remote nodes in an Ethernet passive optical network (EPON) which includes a central node and at least one remote node, wherein a number of virtual remote nodes are coupled to a common physical remote node and transmit upstream data through a common transmitter within the common physical remote node, the method comprising:

receiving a solicitation message from the central node at a remote node during a discovery cycle, wherein the remote node is coupled to multiple virtual remote nodes, and wherein the solicitation message assigns a discovery slot in which an unregistered virtual remote node may transmit a response message to the central node for registration without scheduling by the central node; and transmitting a response message from an unregistered virtual remote node to register within the assigned discovery slot;

wherein if the virtual remote nodes coupled to the common physical remote node seek registration concurrently, the method further comprises controlling the transmission of response messages from these virtual remote nodes to the central node so as to avoid collisions between response messages from different remote nodes.

2. The method of claim 1, further comprising maintaining a queue within the common physical node to store the response messages from the virtual remote nodes; and wherein if multiple virtual remote nodes coupled to the common physical remote node seek registration concurrently, controlling the transmission of response messages involves transmitting only one response message from the queue to the central node during the assigned discovery slot.

3. The method of claim 2, wherein transmitting only one response message from the queue to the central node during the assigned discovery slot further involves:

transmitting the response message at the head of the queue; and if the response message does not result in a successful registration, re-inserting the response message at the tail of the queue.

4. The method of claim 2, wherein if multiple virtual remote nodes coupled to the common physical remote node seek registration concurrently, controlling the transmission of response messages further involves:

allowing the response message at the head of the queue to attempt a number of transmissions to obtain a successful registration; and if after the number of transmissions the response message still does not result in a successful registration, re-inserting the response message at the tail of the queue.

5. The method of claim 4, wherein if multiple virtual remote nodes coupled to the common physical remote node seek registration concurrently, and if after the number of transmissions the response message does not result in a successful registration, controlling the transmission of response messages further involves:

suspending transmission of the response message for a predefined interval of time or for a predefined number of discovery cycles; and after the suspension, re-inserting the response message at the tail of the queue.

6. The method of claim 1, wherein if multiple virtual remote nodes coupled to the common physical remote node seek registration concurrently, controlling the transmission of response messages involves transmitting a number of response messages within the assigned discovery slot;

wherein each response message is associated with a virtual remote node seeking registration; and wherein the number of response messages do not overlap with one another within the discovery slot.

7. The method of claim 6, wherein transmitting the number of response messages further involves transmitting the number of response messages back-to-back within the assigned discovery slot.

8. The method of claim 1, wherein if multiple virtual remote nodes coupled to the common physical remote node seek registration concurrently, controlling the transmission of response messages involves:
   sending one aggregate response message which carries registration information for all the unregistered virtual remote nodes coupled to the common physical node;
   whereby the aggregate response message allows registration of multiple virtual remote nodes simultaneously.

9. The method of claim 1, wherein if a predefined number of prior transmissions of the response message did not result in a successful registration, the method further comprises suspending the transmission of a response message from an unregistered remote node or an unregistered virtual remote node for a suspension period.

10. The method of claim 9, wherein the suspension period is a predefined interval of time or a predefined number of discovery cycles.

11. The method of claim 9, further comprising resuming the transmission of the response message upon receiving a unicast solicitation message from the central node.

12. The method of claim 1, wherein if a response message from an unregistered remote node or an unregistered virtual remote node results in an explicit negative acknowledgement from the central node, the method further comprises suspending future transmission of the response message for a predefined period.

13. The method of claim 1, wherein if a response message from an unregistered remote node or an unregistered virtual remote node results in an explicit negative acknowledgement from the central node, the method further comprises suspending future transmission of the response message until a unicast solicitation is received from the central node.

14. The method of claim 13, wherein the suspension is subject to a timeout period, at the end of which transmission of the response message is resumed.

15. The method of claim 13, wherein if a response message from an unregistered remote node or an unregistered virtual remote node results in an explicit negative acknowledgement from the central node, the method further comprises:
   continuously monitoring the downstream data transmitted by the central node; and
   if there is a disruption in the downstream data sent by the central node, which may indicate a power loss or a system restart at the central node, exiting the suspension and resuming transmission of the response message.

16. A method for registering remote nodes in an Ethernet passive optical network (EPON) which includes a central node and at least one remote node, wherein a number of virtual remote nodes are coupled to a common physical remote node and transmit upstream data through a common transmitter within the common physical remote node, the method comprising:
   receiving a solicitation message from the central node at a remote node during a discovery cycle, wherein the remote node is coupled to multiple virtual remote nodes, and wherein the solicitation message assigns a discovery slot in which an unregistered virtual remote node may transmit a response message to the central node for registration without scheduling by the central node; and
   selectively transmitting a response message from an unregistered remote node or an unregistered virtual remote node for registration within the assigned discovery slot, thereby reducing the collision probability among transmitted response messages.

17. The method of claim 16, wherein if a predefined number of prior transmissions of the response message did not result in a successful registration, selectively transmitting of the response message involves suspending the transmission of the response message for a suspension period.

18. The method of claim 17, wherein the suspension period is a predefined interval of time or a predefined number of discovery cycles.

19. The method of claim 17, wherein if a predefined number of prior transmissions of the response message did not result in a successful registration, selectively transmitting of the response message further involves resuming the transmission of the response message upon receiving a unicast solicitation message from the central node.

20. The method of claim 16, wherein if a response message from an unregistered remote node or an unregistered virtual remote node results in an explicit negative acknowledgement from the central node, the method further comprises suspending future transmission of the response message for a predefined period.

21. The method of claim 16, wherein if a response message from an unregistered remote node or an unregistered virtual remote node results in an explicit negative acknowledgement from the central node, the method further comprises suspending future transmission of the response message until a unicast solicitation is received from the central node.

22. The method of claim 21, wherein the suspension is subject to a timeout period, at the end of which transmission of the response message is resumed.

23. The method of claim 21, wherein if a response message from an unregistered remote node or an unregistered virtual remote node results in an explicit negative acknowledgement from the central node, the method further comprises:
   continuously monitoring the downstream data transmitted by the central node; and
   if there is a disruption in the downstream data sent by the central node, which may indicate a power loss or a system restart at the central node, exiting the suspension and resuming transmission of the response message.

24. The method of claim 16, further comprising maintaining a queue within the common physical node to store the response messages from the virtual remote nodes; and
   wherein if multiple virtual remote nodes coupled to the common physical remote node seek registration concurrently, the method further comprises transmitting only one response message from the queue to the central node during the assigned discovery slot.

25. The method of claim 24, wherein transmitting only one response message from the queue to the central node during the assigned discovery slot further involves:
   transmitting the response message at the head of the queue; and
   if the response message does not result in a successful registration, re-inserting the response message at the tail of the queue.

26. The method of claim 24, wherein if multiple virtual remote nodes coupled to the common physical remote node seek registration concurrently, the method further comprises:
   allowing the response message at the head of the queue to attempt a number of transmissions to obtain a successful registration; and
   if after the number of transmissions the response message still does not result in a successful registration, re-inserting the response message at the tail of the queue.

27. The method of claim 26, wherein if multiple virtual remote nodes coupled to the common physical remote node seek registration concurrently, and wherein if after the number of transmissions the response message does not result in a successful registration, the method further comprises:

suspending transmission of the response message for a predefined interval of time or for a predefined number of discovery cycles; and after the suspension, re-inserting the response message at the tail of the queue.

28. The method of claim 16, wherein if multiple virtual remote nodes coupled to the common physical remote node seek registration concurrently, the method further comprises transmitting a number of response messages within the assigned discovery slot;

wherein each response message is associated with a virtual remote node seeking registration; and wherein the number of response messages do not overlap with one another within the discovery slot.

29. The method of claim 28, wherein transmitting the number of response messages further involves transmitting the number of response messages back-to-back within the assigned discovery slot.

30. The method of claim 16, wherein if multiple virtual remote nodes coupled to the common physical remote node seek registration concurrently, the method further comprises:

sending one aggregate response message which carries registration information for all the unregistered virtual remote nodes coupled to the common physical node;

whereby the aggregate response message allows registration of multiple virtual remote nodes simultaneously.

31. An apparatus for registering remote nodes in an Ethernet passive optical network (EPON), comprising:

a central node;

at least one physical remote node; and a number of virtual remote nodes which are coupled to a common physical remote node and which transmit upstream data through a common transmitter within the common physical remote node;

a receiving mechanism configured to receive a solicitation message from the central node during a discovery cycle, wherein the remote node is coupled to multiple virtual remote nodes, and wherein the solicitation message assigns a discovery slot in which an unregistered virtual remote node may transmit a response message to the central node for registration without scheduling by the central node;

a transmission mechanism configured to transmit a response message from an unregistered virtual remote node to register within the assigned discovery slot; and a control mechanism, wherein if the virtual remote nodes coupled to the common physical remote node seek registration concurrently, the control mechanism is configured to control the transmission of response messages from these virtual remote nodes to the central node so as to avoid collisions between response messages from different remote nodes.

32. The apparatus of claim 31, wherein the control mechanism is further configured to maintain a queue within the common physical node to store the response messages from the virtual remote nodes; and wherein if multiple virtual remote nodes coupled to the common physical remote node seek registration concurrently, the control mechanism is further configured to transmit only one response message from the queue to the central node during the assigned discovery slot.

33. The apparatus of claim 32, wherein while transmitting only one response message from the queue to the central node during the assigned discovery slot, the control mechanism is further configured to:

transmit the response message at the head of the queue; and if the response message does not result in a successful registration, to re-insert the response message at the tail of the queue.

34. The apparatus of claim 32, wherein if multiple virtual remote nodes coupled to the common physical remote node seek registration concurrently, the control mechanism is further configured to:

allow the response message at the head of the queue to attempt a number of transmissions to obtain a successful registration; and if after the number of transmissions the response message still does not result in a successful registration, to re-insert the response message at the tail of the queue.

35. The apparatus of claim 34, wherein if multiple virtual remote nodes coupled to the common physical remote node seek registration concurrently, and if after the number of transmissions the response message does not result in a successful registration, the control mechanism is further configured to:

suspend transmission of the response message for a predefined interval of time or for a predefined number of discovery cycles; and after the suspension, to re-insert the response message at the tail of the queue.

36. The apparatus of claim 31, wherein if multiple virtual remote nodes coupled to the common physical remote node seek registration concurrently, the control mechanism is configured to transmit a number of response messages within the assigned discovery slot;

wherein each response message is associated with a virtual remote node seeking registration; and wherein the number of response messages do not overlap with one another within the discovery slot.

37. The apparatus of claim 36, wherein while transmitting the number of response messages, the control mechanism is further configured to transmit the number of response messages back-to-back within the assigned discovery slot.

38. The apparatus of claim 31, wherein if multiple virtual remote nodes coupled to the common physical remote node seek registration concurrently, the control mechanism is configured to:

send one aggregate response message which carries registration information for all the unregistered virtual remote nodes coupled to the common physical node;

whereby the aggregate response message allows registration of multiple virtual remote nodes simultaneously.

39. The apparatus of claim 31, wherein if a predefined number of prior transmissions of a response message did not result in a successful registration, an unregistered remote node or an unregistered virtual remote node is configured to suspend the transmission of the response message for a suspension period.

40. The apparatus of claim 39, wherein the suspension period is a predefined interval of time or a predefined number of discovery cycles.

41. The apparatus of claim 39, wherein if a predefined number of prior transmissions of a response message did not result in a successful registration, an unregistered remote node or an unregistered virtual remote node is further configured to resume the transmission of the response message upon receiving a unicast solicitation message from the central node.

42. The apparatus of claim 31, wherein if a response message from an unregistered remote node or an unregistered virtual remote node results in an explicit negative acknowledgement from the central node, the unregistered remote node or the unregistered virtual remote node is configured to suspend future transmission of the response message for a predefined period.

43. The apparatus of claim 31, wherein if a response message from an unregistered remote node or an unregistered virtual remote node results in an explicit negative acknowledgement from the central node, the unregistered remote node or the unregistered virtual remote node is configured to suspend future transmission of the response message until a unicast solicitation is received from the central node.

44. The apparatus of claim 43, wherein the suspension is subject to a timeout period, at the end of which transmission of the response message is resumed.

45. The apparatus of claim 43, wherein if a response message from an unregistered remote node or an unregistered virtual remote node results in an explicit negative acknowledgement from the central node, the unregistered remote node or the unregistered virtual remote node is configured to:
continuously monitor the downstream data transmitted by the central node; and
if there is a disruption in the downstream data sent by the central node, which may indicate a power loss or a system restart at the central node, to exit the suspension and resuming transmission of the response message.

46. A apparatus for registering remote nodes in an Ethernet passive optical network (EPON), comprising:
a central node;
at least one physical remote node;
a number of virtual remote nodes which are coupled to a common physical remote node and which transmit upstream data through a common transmitter within the common physical remote node; and
a receiving mechanism configured to receive a solicitation message from the central node during a discovery cycle, wherein the solicitation message assigns a discovery slot in which an unregistered remote node may transmit a response message to the central node for registration without scheduling by the central node;
wherein an unregistered remote node or an unregistered virtual remote node is configured to selectively transmit a response message for registration within the assigned discovery slot, thereby reducing the collision probability among transmitted response messages.

47. The apparatus of claim 46, wherein if a predefined number of prior transmissions of the response message did not result in a successful registration, the control mechanism is configured to suspend the transmission of the response message for a suspension period.

48. The apparatus of claim 47, wherein the suspension period is a predefined interval of time or a predefined number of discovery cycles.

49. The apparatus of claim 47, wherein if a predefined number of prior transmissions of the response message did not result in a successful registration, the control mechanism is further configured to resume the transmission of the response message upon receiving a unicast solicitation message from the central node.

50. The apparatus of claim 46, wherein if a response message from an unregistered remote node or an unregistered virtual remote node results in an explicit negative acknowledgement from the central node, the unregistered remote node or the unregistered virtual remote node is further configured to suspend future transmission of the response message for a predefined period.

51. The apparatus of claim 46, wherein if a response message from an unregistered remote node or an unregistered virtual remote node results in an explicit negative acknowledgement from the central node, the unregistered remote node or the unregistered virtual remote node is further configured to suspend future transmission of the response message until a unicast solicitation is received from the central node.

52. The apparatus of claim 51, wherein the suspension is subject to a timeout period, at the end of which transmission of the response message is resumed.

53. The apparatus of claim 51, wherein if a response message from an unregistered remote node or an unregistered virtual remote node results in an explicit negative acknowledgement from the central node, the unregistered remote node or the unregistered virtual remote node is further configured to:
continuously monitor the downstream data transmitted by the central node; and
if there is a disruption in the downstream data sent by the central node, which may indicate a power loss or a system restart at the central node, to exit the suspension and resuming transmission of the response message.

54. The apparatus of claim 46, further comprising a control mechanism configured to maintain a queue within the common physical node to store the response messages from the virtual remote nodes; and
wherein if multiple virtual remote nodes coupled to the common physical remote node seek registration concurrently, the control mechanism is further configured to transmit only one response message from the queue to the central node during the assigned discovery slot.

55. The apparatus of claim 54, wherein while transmitting only one response message from the queue to the central node during the assigned discovery slot, the control mechanism is further configured to:
transmit the response message at the head of the queue; and
if the response message does not result in a successful registration, to re-insert the response message at the tail of the queue.

56. The apparatus of claim 54, wherein if multiple virtual remote nodes coupled to the common physical remote node seek registration concurrently, the control mechanism is further configured to:
allow the response message at the head of the queue to attempt a number of transmissions to obtain a successful registration; and
if after the number of transmissions the response message still does not result in a successful registration, to re-insert the response message at the tail of the queue.

57. The apparatus of claim 56, wherein if multiple virtual remote nodes coupled to the common physical remote node seek registration concurrently, and wherein if after the number of transmissions the response message does not result in a successful registration, the control mechanism is further configured to:
suspend transmission of the response message for a predefined interval of time or for a predefined number of discovery cycles; and
after the suspension, to re-insert the response message at the tail of the queue.

58. The apparatus of claim 46, further comprising a control mechanism, wherein if multiple virtual remote nodes coupled to the common physical remote node seek registration concurrently, the control mechanism is configured to transmit a number of response messages within the assigned discovery slot;
wherein each response message is associated with a virtual remote node seeking registration; and wherein the number of response messages do not overlap with one another within the discovery slot.

59. The apparatus of claim 58, wherein while transmitting the number of response messages, the control mechanism is further configured to transmit the number of response messages back-to-back within the assigned discovery slot.

60. The apparatus of claim 46, further comprising a control mechanism, wherein if multiple virtual remote nodes coupled to the common physical remote node seek registration concurrently, the control mechanism is configured to:
   send one aggregate response message which carries registration information for all the unregistered virtual remote nodes coupled to the common physical node;
   whereby the aggregate response message allows registration of multiple virtual remote nodes simultaneously.

* * * * *